(12) United States Patent
Luo et al.

(10) Patent No.: US 12,461,134 B2
(45) Date of Patent: Nov. 4, 2025

(54) SPECIFIC ABSORPTION RATE DETECTION ASSEMBLY, SPECIFIC ABSORPTION RATE DETECTION METHOD, AND ELECTRONIC DEVICE

(71) Applicant: GUANGDONG OPPO MOBILE TELECOMMUNICATIONS CORP., LTD., Guangdong (CN)

(72) Inventors: Yizhou Luo, Guangdong (CN); Jia Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 128 days.

(21) Appl. No.: 18/505,792

(22) Filed: Nov. 9, 2023

(65) Prior Publication Data

US 2024/0069084 A1   Feb. 29, 2024

Related U.S. Application Data

(63) Continuation of application No. PCT/CN2022/086397, filed on Apr. 12, 2022.

(30) Foreign Application Priority Data

May 14, 2021 (CN) .......................... 202110529076.3

(51) Int. Cl.
    *G01R 29/08* (2006.01)
    *G01R 29/26* (2006.01)

(52) U.S. Cl.
    CPC ..... *G01R 29/0892* (2013.01); *G01R 29/0857* (2013.01); *G01R 29/26* (2013.01)

(58) Field of Classification Search
    CPC .............. G01R 29/0892; G01R 29/0857; G01R 29/26; G01R 27/2605; G01V 3/00
(Continued)

(56) References Cited

U.S. PATENT DOCUMENTS

| 2009/0322351 | A1 | 12/2009 | McLeod |
| 2020/0014789 | A1* | 1/2020 | Rouaissia .............. G06F 3/044 |
| 2022/0034683 | A1* | 2/2022 | Seo ...................... G01N 27/223 |

FOREIGN PATENT DOCUMENTS

| CN | 103443999 | 12/2013 |
| CN | 106201124 | 12/2016 |

(Continued)

OTHER PUBLICATIONS

WIPO, International Search Report and Written Opinion for International Application No. PCT/CN2022/086397, Jun. 22, 2022.

(Continued)

*Primary Examiner* — Christopher P McAndrew
(74) *Attorney, Agent, or Firm* — Hodgson Russ LLP (57) ABSTRACT

A specific absorption rate detection assembly, an SAR detection method, and an electronic device are provided. The SAR detection assembly includes a sensing branch, a detection branch, an SAR sensor, and a compensation branch. The sensing branch is configured to sense a capacitive signal. The detection branch is configured to generate a first noise signal by sensing ambient noise. The capacitive signal and the first noise signal are transmitted to the SAR sensor by the detection branch. A first end of the compensation branch is connected to a reference power-supply terminal. The compensation branch is configured to generate a second noise signal by sensing ambient noise and transmit the second noise signal to the SAR sensor. The second noise signal is used to simulate the first noise signal to compensate, through the second noise signal, the capacitive signal and the first noise signal transmitted to the SAR sensor.

19 Claims, 7 Drawing Sheets

(58) Field of Classification Search
USPC .......................................................... 324/663
See application file for complete search history.

(56) References Cited

FOREIGN PATENT DOCUMENTS

| | | |
|---|---|---|
| CN | 207518945 | 6/2018 |
| CN | 110289495 | 9/2019 |
| CN | 110708404 | 1/2020 |
| CN | 111491051 | 8/2020 |
| CN | 111511006 | 8/2020 |
| CN | 212115692 | 12/2020 |
| KR | 102234612 | 4/2021 |

OTHER PUBLICATIONS

CNIPA, First Office Action for CN Application No. 202110529076.3, Feb. 26, 2025.
CNIPA, Second Office Action for CN application No. 202110529076.3, Aug. 21, 2025.

* cited by examiner

SPECIFIC ABSORPTION RATE DETECTION ASSEMBLY, SPECIFIC ABSORPTION RATE DETECTION METHOD, AND ELECTRONIC DEVICE

CROSS-REFERENCE TO RELATED APPLICATION(S)

This application is a continuation of International Application No. PCT/CN2022/086397, filed Apr. 12, 2022, which claims priority to Chinese Patent Application No. 202110529076.3, filed May 14, 2021, the entire disclosures of which are incorporated herein by reference.

TECHNICAL FIELD

This disclosure relates to the technical field of electronic devices, and in particular, to a specific absorption rate (SAR) detection assembly, an SAR detection method, and an electronic device.

BACKGROUND

With development and progress of technology, application of $5^{th}$ generation (5G) mobile terminals is gradually widespread. In the 5G mobile terminal, the number of antennas is relatively large, and compliance requirements for specific absorption rate (SAR) are strict. In the related art, in order to avoid an over-standard SAR, an SAR sensor is used to detect a change in a capacitance of a sensing branch of an electronic device to determine a positional relationship between a human body and the electronic device. The sensing branch is electrically connected to the SAR sensor. However, in the case where the sensing branch is relatively far away from the SAR sensor, a detection result of the SAR sensor is prone to an error due to an impact of the environment, and thus detection accuracy is reduced.

It needs to be noted that the information disclosed in the above background section is only used to enhance understanding of the background of the disclosure, and may include information that does not constitute the related art known to those of ordinary skill in the art.

SUMMARY

A specific absorption rate (SAR) detection assembly, an SAR detection method, and an electronic device are provided in the disclosure.

In a first aspect of the disclosure, an SAR detection assembly is provided. The SAR detection assembly includes a sensing branch, a detection branch, an SAR sensor, and a compensation branch. The sensing branch is configured to sense a capacitive signal. A first end of the detection branch is connected to the sensing branch, and the detection branch is configured to transmit the capacitive signal and generate a first noise signal by sensing ambient noise. The SAR sensor is connected to a second end of the detection branch, and the capacitive signal and the first noise signal are transmitted to the SAR sensor by the detection branch. A first end of the compensation branch is connected to a reference power-supply terminal, and a second end of the compensation branch is connected to the SAR sensor. The compensation branch is configured to generate a second noise signal by sensing ambient noise and transmit the second noise signal to the SAR sensor. The second noise signal is used to simulate the first noise signal to compensate, through the second noise signal, the capacitive signal and the first noise signal that are transmitted to the SAR sensor by the detection branch.

In a second aspect of the disclosure, an SAR detection method is provided. The SAR detection method is applicable to the SAR detection assembly and includes the following. Obtain a signal transmitted to the SAR sensor by the detection branch. The signal transmitted to the SAR sensor by the detection branch includes a capacitive signal and a first noise signal. Obtain a second noise signal that is transmitted to the SAR sensor by the compensation branch. Determine a capacitive signal sensed by the sensing branch, by compensating, according to the second noise signal, the signal transmitted to the SAR sensor by the detection branch.

In a third aspect of the disclosure, an electronic device is provided. The electronic device includes the SAR detection assembly.

It needs to be understood that the above general illustration and the following detailed illustration are merely exemplary and explanatory, and does not constitute a limitation on the disclosure.

BRIEF DESCRIPTION OF THE DRAWINGS

The accompanying drawings herein are incorporated into the specification and constitute a part of the specification, illustrate embodiments in accordance with the disclosure, and are used to explain principles of the disclosure together with the specification. Obviously, the accompanying drawings described below are merely some embodiments of the disclosure. For a person ordinarily skilled in the art, other accompanying drawings can also be obtained based on these accompanying drawings without creative efforts.

DETAILED DESCRIPTION

Exemplary embodiments will be described more comprehensively with reference to accompanying drawings. However, exemplary embodiments can be implemented in various forms, and it is to be understood that the present disclosure is not limited to the embodiments set forth herein. On the contrary, these embodiments are provided to make the disclosure more comprehensive and complete, and ideas of the exemplary embodiments can be comprehensively conveyed to those skilled in the art. The same reference signs in the drawings represent the same or similar structures, and thus their detailed illustrations will be omitted.

Although relative terms, such as "upper" and "lower", are used throughout the specification to describe a relative relationship of one assembly to another assembly of an icon, these terms are used in the specification for convenience only, e.g., according to a direction of an example depicted in a figure. It will be understood that if an apparatus in the figure is turned over upside down, an "upper" component will become a "lower" component. When a structure is "on" another structure, it may mean that the structure is integrally formed on another structure, or that the structure is "directly" disposed on another structure, or that the structure is "indirectly" disposed on another structure via yet another structure.

Figure 1:
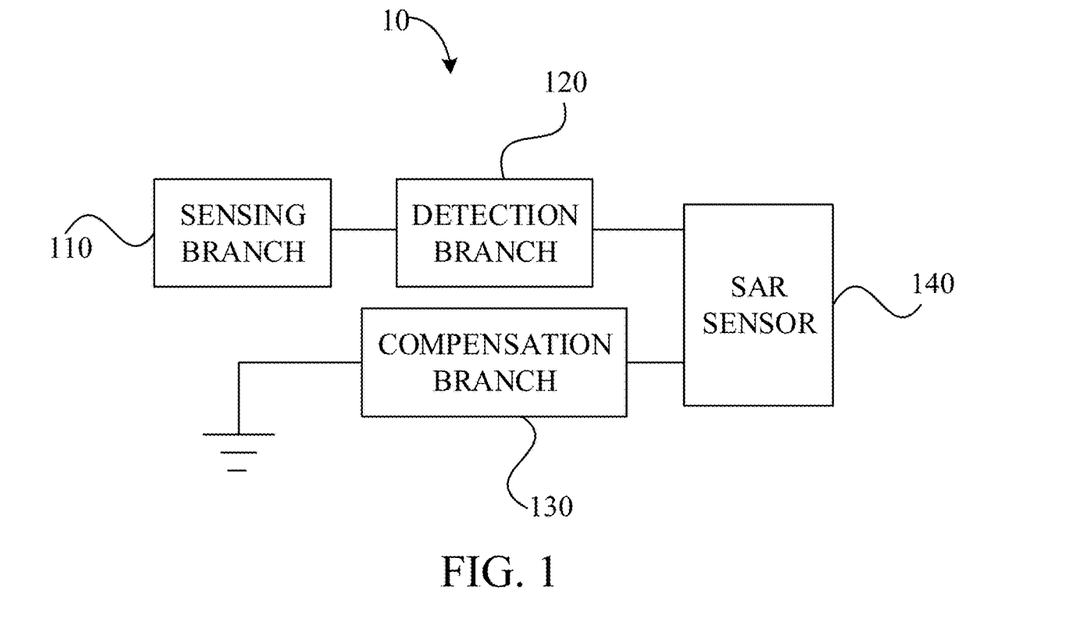
FIG. 1 is a schematic view of a first type of a specific absorption rate (SAR) detection assembly provided in exemplary embodiments of the disclosure.

A specific absorption rate (SAR) detection assembly 10 is first provided in exemplary embodiments of the disclosure. As illustrated in FIG. 1, the SAR detection assembly 10 includes a sensing branch 110, a detection branch 120, a compensation branch 130, and an SAR sensor 140. The sensing branch 110 is configured to sense a capacitive signal. A first end of the detection branch 120 is connected to the sensing branch 110, and the detection branch 120 is configured to transmit the capacitive signal and generate a first noise signal by sensing ambient noise. The SAR sensor 140 is connected to a second end of the detection branch 120, and the capacitive signal sensed by the sensing branch 110 and the first noise signal are transmitted to the SAR sensor 140 by the detection branch 120. A first end of the compensation branch 130 is connected to a reference power-supply terminal, and a second end of the compensation branch 130 is connected to the SAR sensor 140. The compensation branch 130 is configured to generate a second noise signal by sensing ambient noise and transmit the second noise signal to the SAR sensor 140. The second noise signal is used to simulate the first noise signal to compensate, through the second noise signal, a signal transmitted to the SAR sensor 140 by the detection branch 120.

The detection branch 120 and the compensation branch 130 may be connected in a differential manner. In differential dual channels, the compensation branch 130 is independent from the detection branch 120 (i.e., the compensation branch 130 is not connected to the sensing branch 110).

The signal transmitted to the SAR sensor 140 by the detection branch 120 includes the capacitance signal and the first noise signal. The second noise signal is used to simulate the first noise signal. The compensation branch 130 is configured to enable the second noise signal to be consistent with the first noise signal. The second noise signal being consistent with the first noise signal means that the second noise signal is the same as or similar to the first noise signal (i.e., an error is in an allowed range).

In the SAR detection assembly 10 provided in embodiments of the disclosure, the detection branch 120 transmits to the SAR sensor 140 the capacitive signal sensed by the sensing branch 110, and the compensation branch 130 generates the second noise signal by sensing ambient noise and transmits the second noise signal to the SAR sensor 140. The second noise signal is used to simulate the first noise signal that is generated by the detection branch 120 in response to ambient noise, so that the signal transmitted to the SAR sensor 140 by the detection branch 120 can be compensated through the second noise signal to separate the first noise signal, thereby improving detection accuracy of the SAR detection assembly 10. Therefore, the sensing branch 110 is allowable to be disposed at a position relatively far away from the SAR sensor 140, and the SAR sensor 140 can be connected to sensing branches at multiple positions.

The following describes in detail each component of the SAR detection assembly 10 provided in exemplary embodiments of the disclosure.

Figure 2:
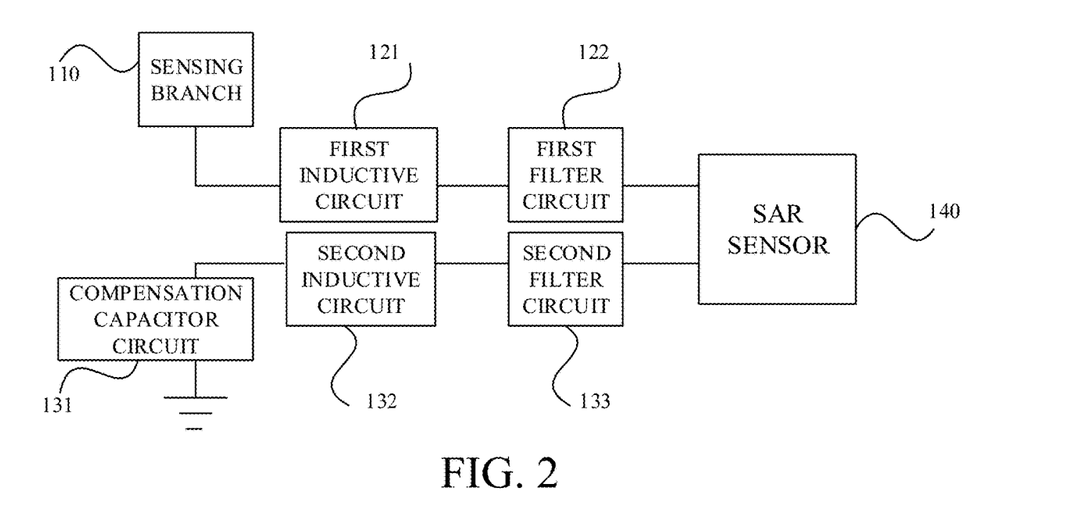
FIG. 2 is a schematic view of a second type of an SAR detection assembly provided in exemplary embodiments of the disclosure.

As illustrated in FIG. 2, the sensing branch 110 is associated with a corresponding antenna (ANT) radiator, and the capacitance signal is used to determine a distance relationship (e.g., approaching or moving away) between the ANT radiator and a human body (for example, a hand or a head of a user). The sensing branch 110 being associated with the ANT radiator means that the ANT radiator can serve as the sensing branch 110. In this case, the ANT radiator is suspended, and "suspended" means that the ANT radiator can be directly used for SAR detection. There is no direct-current path between the ANT radiator and a feeding terminal and no direct-current path between the ANT radiator and a grounding terminal. That is, the ANT radiator is not connected (coupled) to the feeding terminal or a direct-current block (e.g., a capacitor) is disposed between the ANT radiator and the feeding terminal, and the ANT radiator is not connected to the grounding terminal or a direct-current block (e.g., a capacitor) is disposed between the ANT radiator and the grounding terminal.

Alternatively, the sensing branch 110 being associated with the ANT radiator means that the sensing branch 110 may include an inductor. The inductor is located near a corresponding ANT radiator, i.e., a distance between the sensing branch 110 and the corresponding ANT radiator is less than a preset sensing distance, and thus the sensing branch 110 serves as a parasitic branch. In this case, there is a path allowing direct-current transmission between the ANT radiator and the grounding terminal and/or between the ANT radiator and the feeding terminal. The sensing branch 110 may be made of a conductive material such as a metal, or may be made of a semi-conductive material, which is not specifically limited in embodiments of the disclosure.

On this basis, the ANT radiator cannot be directly used for SAR detection, and a direct-current path is between the ANT radiator and the grounding terminal and/or between the ANT radiator and the feeding terminal. It may be understood that direct-current transmission can be performed between the ANT radiator and at least one of the grounding terminal or the feeding terminal. That is, the ANT radiator is connected to the grounding terminal, and no direct-current block (e.g., no capacitor) is disposed between the ANT radiator and the grounding terminal. Alternatively, the ANT radiator is connected to the feeding terminal, and no direct-current block (e.g., no capacitor) is disposed between the ANT radiator and the feeding terminal. Alternatively, the ANT radiator is connected to both the feeding terminal and the grounding terminal, and no direct-current block (e.g., no capacitor) is disposed between the ANT radiator and the feeding terminal and between the ANT radiator and the grounding terminal. The feeding terminal refers to a terminal that can provide a feeding signal for the ANT radiator, and the feeding terminal is generally connected to a radio frequency (RF) circuit.

Figure 3:
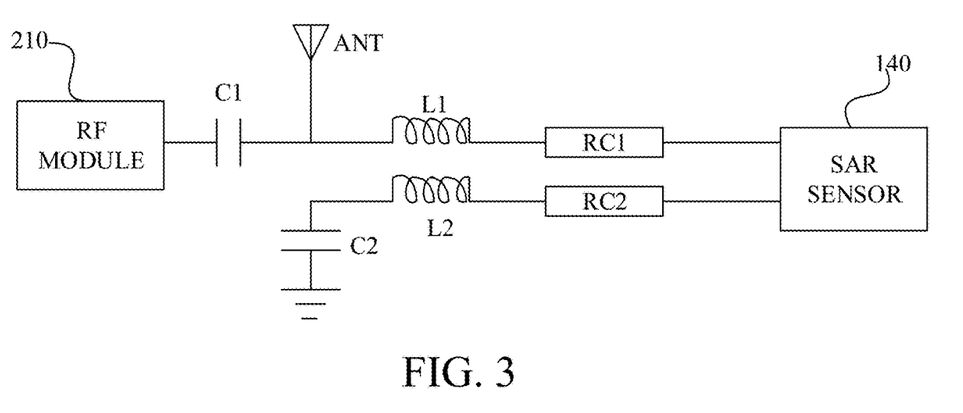
FIG. 3 is a schematic view of a third type of an SAR detection assembly provided in exemplary embodiments of the disclosure.

As illustrated in FIG. 3, the sensing branch 110 is an ANT radiator, that is, the ANT radiator serves as the sensing branch 110. The ANT radiator is connected to the SAR sensor 140 and may be disposed at a frame of an electronic device. The frame of the electronic device may be a metal frame. The metal frame is divided into multiple sensing branches. One branch in the multiple branches of the metal frame serves as the ANT radiator.

The ANT radiator is connected to an RF module 210, and the RF module 210 is configured for RF-signal transmission and reception. The ANT radiator is coupled to the RF module 210 via a capacitor C1. In practical applications, the ANT radiator may be connected to the RF module 210 in other manners, which is not specifically limited in embodiments of the disclosure.

In the case where the ANT radiator serves as the sensing branch 110, the ANT radiator is suspended. The ANT radiator may further be connected to a tuning circuit unit, and the tuning circuit unit may include one or more tuning circuits. For example, the tuning circuit unit may include a first tuning circuit and a second tuning circuit. The first tuning circuit may include a first tuning switch, a first end of the first tuning switch is connected to the ANT radiator, and a second end of the first tuning switch may be grounded. For example, the first tuning switch may include a first metal-oxide-semiconductor (MOS) transistor, a first end of the first MOS transistor is connected to the ANT radiator, and a second end of the first MOS transistor may be grounded. The first MOS transistor may be off during SAR detection. The second tuning circuit may include a second tuning switch, a first end of the second tuning switch is connected to the ANT radiator, and a second end of the second tuning switch may be grounded. For example, the second tuning switch may include a second MOS transistor, a first end of the second MOS transistor is connected to the ANT radiator, and a second end of the second MOS transistor may be grounded. The second MOS transistor may be off during SAR detection.

Figure 4:
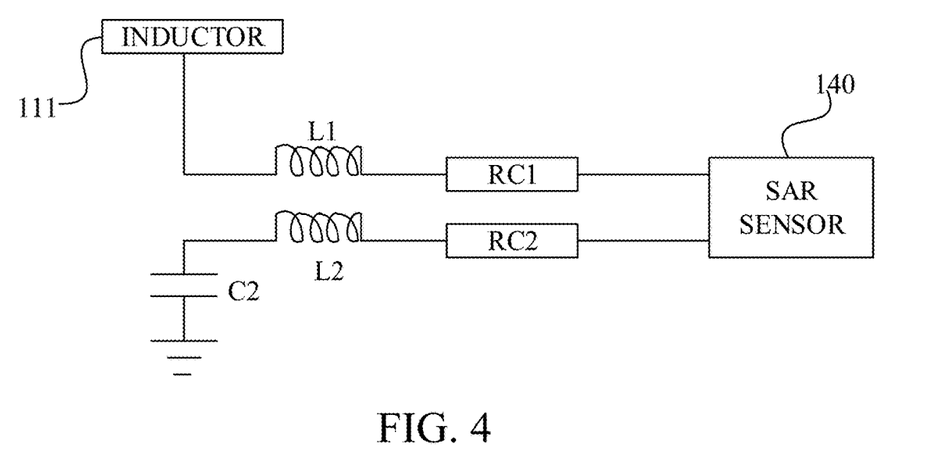
FIG. 4 is a schematic view of a fourth type of an SAR detection assembly provided in exemplary embodiments of the disclosure.

Alternatively, as illustrated in FIG. 4, the sensing branch 110 is an inductor 111, and the inductor 111 may be a conductor or a semiconductor near the ANT radiator. In this case, the ANT radiator cannot be directly used for SAR detection.

The inductor 111 may be a parasitic branch coupled with the ANT radiator, the parasitic branch is capable of direct SAR detection, and the parasitic branch may be suspended for direct current.

Alternatively, the inductor 111 is not coupled to the ANT radiator. The inductor 111 may be one or more of a flexible circuit board, a volume button, a power button, a fingerprint module, a receiver, a speaker module, a camera module, a wireless charging module, a mainboard holder, a small-board holder, a near field communication (NFC) module, a camera decorative ring, and a conductor card holder.

In the case where the inductor 111 is a flexible circuit board, the flexible circuit board may be connected to both the ANT radiator and a mainboard of the electronic device. The flexible circuit board is located near the ANT radiator and can serve as a flexible-circuit-board branch. The flexible-circuit-board branch may be a parasitic branch of the flexible circuit board. The flexible-circuit-board branch can also form a capacitor with a human body sensed. A distance between the ANT radiator and the human body can be determined by detecting an inductive capacitor formed by the flexible-circuit-board branch.

In the case where the inductor 111 is a volume button, the volume button is made of a conductive material, for example, the volume button may be made of aluminum alloy, stainless steel, etc. The volume button may be disposed at the frame of the electronic device. An insulation coating may be coated at a position where the volume button contacts the frame, so that the volume button is suspended.

A through hole may be defined on a side frame of the electronic device, and the volume button is placed into the electronic device through the through hole and is connected to a volume adjustment circuit. An insulation material may be coated on a surface of the volume button to isolate the volume button from the frame. In practical applications, an insulation material may be coated on an inner wall of the through hole on the frame.

In the case where the inductor 111 is a power button, the power button is made of a conductive material, for example, the power button may be made of aluminum alloy, stainless steel, etc. The power button may be disposed at the frame of the electronic device. An insulation coating may be coated at a position where the power button contacts the frame, so that the power button is suspended.

A through hole may be defined on the side frame of the electronic device, and the power button is placed into the electronic device through the through hole and is connected to a power circuit. An insulation material may be coated on a surface of the power button to isolate the power button from the frame. In practical applications, an insulation material may be coated on an inner wall of the through hole on the frame.

In the case where the inductor 111 is a mainboard holder, the mainboard holder may be made of a conductive material, for example, the mainboard holder is made of aluminum alloy, copper, stainless steel, etc. The mainboard holder may be disposed at a middle frame, and a mainboard is mounted to the mainboard holder. Both the middle frame and the mainboard are grounded, and thus the mainboard holder needs to be insulated from the mainboard and the middle frame. For example, the mainboard holder may include a first contact portion and a second contact portion, the first contact portion is in contact with the middle frame, and the second contact portion is connected to the mainboard. Insulation layers may be formed by coating insulation material on the first contact portion and the second contact portion of the mainboard holder.

In the case where the inductor 111 is a small-board holder, the small-board holder may be made of a conductive material, for example, the small-board holder is made of aluminum alloy, copper, stainless steel, etc. The small-board holder may be disposed at the middle frame, and a small board is mounted to the small-board holder. Both the middle frame and the small board are grounded, and thus the small-board holder needs to be insulated from the small board and the middle frame. For example, the small-board holder may include a first contact portion and a second contact portion, the first contact portion is in contact with the middle frame, and the second contact portion is connected to the small board. Insulation layers may be formed by coating insulation material on the first contact portion and the second contact portion of the small-board holder.

In the case where the inductor 111 is a card holder, the card holder may include a conductive portion, and the conductive portion may be made of aluminum alloy, copper, stainless steel, etc. The card holder may include the conductive portion, a connection portion, and an accommodation portion. One end of the connection portion is connected to the conductive portion, and the other end of the connection portion is connected to the accommodation portion. The accommodation portion is configured to accommodate a readable electronic card. When the card holder is mounted to the electronic device, the conductive portion is exposed to the frame of the electronic device. A through hole may be defined on the frame of the electronic device, and the conductive portion extends into the through hole. An insulation layer may be disposed on a side wall of the conductive portion, and the side wall of the conductive portion refers to a portion of the conductive portion facing the through hole. The connection portion may be made of an insulation material. The conductive portion is isolated from the accommodation portion by the connection portion since the accommodation portion is provided with a grounding point. The SAR sensor 140 may be connected to the conductive portion.

In practical applications, the electronic device may include one or more sensing branches 110, to implement full-frequency and all-round detection of the electronic device. For example, the number of the sensing branches 110 in the electronic device may be 1, 2, 3, 4, 5, etc.

For example, the electronic device may include a first sensing branch, a second sensing branch, and a third sensing branch. The first sensing branch is suspended and is configured to sense a first capacitance signal. The second sensing branch is suspended and is configured to sense a second capacitance signal. The third sensing branch is suspended and is configured to sense a third capacitance signal. The SAR sensor 140 is connected to the first sensing branch, the second sensing branch, and the third sensing branch, and is configured to detect the first capacitive signal, the second capacitive signal, and the third capacitive signal.

The first sensing branch may be any one or more of a flexible circuit board, a volume button, a power button, a fingerprint module, a receiver, a speaker module, a camera module, a wireless charging module, a mainboard holder, a small-board holder, an NFC module, a camera decorative ring, and a conductor card holder.

The second sensing branch may be any one or more of a flexible circuit board, a volume button, a power button, a fingerprint module, a receiver, a speaker module, a camera module, a wireless charging module, a mainboard holder, a small-board holder, an NFC module, a camera decorative ring, and a conductor card holder.

The third sensing branch may be any one or more of a flexible circuit board, a volume button, a power button, a fingerprint module, a receiver, a speaker module, a camera module, a wireless charging module, a mainboard holder, a small-board holder, an NFC module, a camera decorative ring, and a conductor card holder. The first sensing branch, the second sensing branch, and the third sensing branch are different from one another.

In embodiments of the disclosure, the detection branch 120 extends from the sensing branch 110 to the SAR sensor 140. Other modules, such as a processor, a microprocessor, a memory, various types of sensors, and an imaging module, are generally disposed between the sensing branch 110 and the SAR sensor 140. These modules may interfere with a signal on the detection branch 120. The compensation branch 130 is configured to detect a noise signal on an output path from the sensing branch 110 to the SAR sensor 140. A main source of noise on a transmission path includes interference of other modules of the electronic device on a wiring path and ambient thermal noise on the transmission path. A first end of the compensation branch 130 is grounded, and a second end of the compensation branch 130 is connected to the SAR sensor 140. The compensation branch 130 can sense an interference signal of an interference module on the wiring path and a thermal noise signal on the wiring path, and transmit the interference signal and the thermal noise signal as a noise signal to the SAR sensor 140.

A layout path of the compensation branch 130 may be consistent with a layout path of the detection branch 120 to accurately detect a noise signal on the detection branch 120. The layout path of the compensation branch 130 is consistent with the layout path of the detection branch 120, so that an interference signal and a thermal noise signal on the detection branch 120 are respectively consistent with an interference signal and a thermal noise signal on the compensation branch 130. That is, the noise signal on the detection branch 120 is consistent with a noise signal in a signal sensed by the compensation branch 130. The noise signal detected by the detection branch 120 can be separated according to the noise signal detected by the compensation branch 130, so that a wanted signal in the signal detected by the detection branch 120 can be obtained.

The detection branch 120 may generate a thermal noise signal in response to an ambient temperature, and the compensation branch 130 may generate a thermal noise signal in response to an ambient temperature. In order to ensure that the thermal noise signal generated by the detection branch 120 in response to the ambient temperature is consistent with the thermal noise signal generated by the compensation branch 130 in response to the ambient temperature, a capacitance-temperature curve of the detection branch 120 is required to be consistent with that of the compensation branch 130. The capacitance-temperature curve refers to a curve generated according to a change in a capacitance of a component in response to a change in temperature. That is, an equivalent capacitance of the detection branch 120 at any temperature is consistent with an equivalent capacitance of the compensation branch 130 at that temperature. Furthermore, a circuit parameter, such as an equivalent resistance and an equivalent inductance, of the detection branch 120 also is consistent with that of the compensation branch 130.

It needs to be noted that, the layout path of the compensation branch 130 being consistent with that of the detection branch 120 means that the compensation branch 130 is arranged along and close to the detection branch 120. That is, a distance between the layout path of the compensation branch 130 and the layout path of the detection branch 120 is less than a preset layout distance. For example, the preset layout distance may be 1 millimeter, 2 millimeters, 3 millimeters, etc., that is, the distance between the layout path of the compensation branch 130 and the layout path of the detection branch 120 is less than 1 millimeter, 2 millimeters, 3 millimeters, etc. Furthermore, a length of the detection branch 120 is consistent with a length of the compensation branch 130, i.e., a difference between the length of the detection branch 120 and the length of the compensation branch 130 does not exceed an allowed error range. Moreover, a wiring manner of the detection branch 120 is consistent with a wiring manner of the compensation branch 130, for example, a wiring path of the detection branch 120 and a wiring path of the compensation branch 130 are both in a shape of a polygonal line, an arc, etc. A component layout position of the detection branch 120 is consistent with that of the compensation branch 130.

The SAR detection is concerned with the capacitance signal obtained by the sensing branch 110. The capacitance signal detected by the detection branch 120 has an impact on a detection result, and thus what is to be detected by the compensation branch 130 is a change in a capacitance caused by an environmental factor. The layout path of the compensation branch 130 being consistent with that of the detection branch 120 is to achieve that a capacitance difference between the second noise signal generated by the compensation branch 130 in response to an environmental factor and the first noise signal does not exceed a preset threshold. For example, a capacitance difference between the second noise signal and the first noise signal does not exceed 1 millifarad (mF), 3 mF, 5 mF, etc.

The first end of the detection branch 120 is connected to the sensing branch 110, and the second end of the detection branch 120 is connected to the SAR sensor 140. As illustrated in FIG. 2, the detection branch 120 may include a first inductive circuit 121 and a first filter circuit 122. A first end of the first inductive circuit 121 is connected to the sensing branch 110. A first end of the first filter circuit 122 is connected to a second end of the first inductive circuit 121, and a second end of the first filter circuit 122 is connected to the SAR sensor 140.

The detection branch 120 may further include multiple connection wires (for example, conductive wires or coaxial wires), and various components of the detection branch 120 may be connected via the multiple connection wires. The first inductive circuit 121 is connected to the ANT radiator 111 via one connection wire, the first inductive circuit 121 is connected to the first filter circuit 122 via one connection wire, and the first filter circuit 122 is connected to the SAR sensor 140 via one connection wire.

The first inductive circuit 121 is configured to isolate the sensing branch 110 from the SAR sensor 140, thereby preventing a high-frequency signal from flowing to the SAR sensor 140. The first inductive circuit 121 may include a first inductor L1. One end of a coil of the first inductor L1 is connected to the sensing branch 110, and the other end of the coil of the first inductor L1 is connected to the SAR sensor 140.

The first filter circuit 122 is configured to filter out an interference signal on the detection branch 120, thereby improving an anti-static interference capability of the detection branch 120. The first filter circuit 122 is disposed close to the SAR sensor 140. For example, the SAR sensor 140 is disposed at the mainboard, and the first filter circuit 122 is disposed at the mainboard and adjacent to the SAR sensor 140.

As illustrated in FIG. 3, the first filter circuit 122 may include a resistor-capacitor (RC) filter circuit, a first end of the RC filter circuit is connected to the second end of the first inductive circuit 121, and a second end of the RC filter circuit is connected to the SAR sensor 140. The RC filter circuit may include a capacitor and a resistor, and the capacitor and the resistor may be connected in series or in parallel. In practical applications, the RC filter circuit may include a component such as an inductor, which is not specifically limited in embodiments of the disclosure.

The first end of the compensation branch 130 is connected to a reference power-supply terminal, and the second end of the compensation branch 130 is connected to the SAR sensor 140. The compensation branch 130 is configured to detect a noise signal on the detection branch 120, and the noise signal is used to compensate the signal transmitted to the SAR sensor 140 by the detection branch 120. The reference power-supply terminal may be a grounding terminal or another power-supply terminal with a constant level.

The compensation branch 130 may include a compensation capacitor circuit 131, a second inductive circuit 132, and a second filter circuit 133. A first end of the compensation capacitor circuit 131 is grounded. A first end of the second inductive circuit 132 is connected to a second end of the compensation capacitor circuit 131. A first end of the second filter circuit 133 is connected to a second end of the second inductive circuit 132, and a second end of the second filter circuit 133 is connected to the SAR sensor 140.

The compensation branch 130 may further include multiple connection wires (for example, conductive wires or coaxial wires), and various components of the compensation branch 130 may be connected via the multiple connection wires. The compensation capacitor circuit 131 is connected to the reference power-supply terminal via one connection wire. The second inductive circuit 132 is connected to the compensation capacitor circuit 131 via one connection wire. The second inductive circuit 132 is connected to the second filter circuit 133 via one connection wire. The second filter circuit 133 is connected to the SAR sensor 140 via one connection wire.

The compensation capacitor circuit 131 may include a compensation capacitor C2. A capacitance plate of the compensation capacitor C2 is grounded, and another capacitance plate of the compensation capacitor C2 is connected to the second inductive circuit 132. The second inductive circuit 132 may include a second inductor L2. One end of a coil of the second inductor L2 is connected to the compensation capacitor C2, and the other end of the coil of the second inductor L2 is connected to the second filter circuit 133. The second inductor L2 is used to simulate the first inductor L1 and may be disposed adjacent to the first inductor L1. For example, the first inductor L1 may be disposed at the mainboard, and the second inductor L2 is disposed at the mainboard and adjacent to the first inductor L1. A signal generated by the second inductor L2 in response to an environmental factor is the same as a noise signal generated by the first inductor L1 in response to an environmental factor.

The second filter circuit 133 is configured to filter out an interference signal on the compensation branch 130, thereby improving an anti-static interference capability of the compensation branch 130. The second filter circuit 133 is disposed close to the SAR sensor 140. For example, the SAR sensor 140 is disposed at the mainboard, and the second filter circuit 133 is disposed at the mainboard and adjacent to the SAR sensor 140.

The second filter circuit 133 may include an RC filter circuit, a first end of the RC filter circuit is connected to the second end of the second inductive circuit 132, and a second end of the RC filter circuit is connected to the SAR sensor 140. The RC filter circuit may include a capacitor and a resistor, and the capacitor and the resistor may be connected in series or in parallel. In practical applications, the RC filter circuit may include a component such as an inductor, which is not specifically limited in embodiments of the disclosure. The second filter circuit 133 is used to simulate the first filter circuit 122 and may be disposed adjacent to the first filter circuit 122. For example, the first filter circuit 122 is disposed at the mainboard, and the second filter circuit 133 is disposed at the mainboard and adjacent to the first filter circuit 122. A signal generated by the second filter circuit 133 in response to an environmental factor is the same as a noise signal generated by the first filter circuit 122 in response to an environmental factor.

Both the second inductive circuit 132 and the compensation capacitor circuit 131 are configured to enable a circuit parameter of the compensation branch 130 to be consistent with a circuit parameter of the detection branch 120. The circuit parameter may include an equivalent capacitance, an equivalent resistance, and an equivalent inductance. In the compensation branch 130, the circuit parameter of the compensation branch 130 can be consistent with that of the detection branch 120 by adjusting an inductance of the second inductive circuit 132 and a capacitance of the compensation capacitor circuit 131.

The SAR sensor 140 may be connected to a controller. The SAR sensor 140 is connected to both the detection branch 120 and the compensation branch 130. The SAR sensor 140 may be connected to both the first filter circuit 122 and the second filter circuit 133. The SAR sensor 140 has multiple channels, for example, the number of the channels of the SAR sensor may be 2, 3, 4, 5, 6, etc. The controller is connected to the SAR sensor 140. The SAR sensor 140 is configured to sense a signal detected by the detection branch 120 and sense a signal detected by the compensation branch 130.

The SAR sensor 140 may include a plate capacitive sensor. When a corresponding part (e.g., a hand or a head) of a human body approaches or moves away from a corresponding position (e.g., the sensing branch 110) of the electronic device, a capacitance change occurs, and thus whether a human body approaches or moves away from the corresponding position of the electronic device can be determined according to the capacitance change. A detection result of the SAR sensor 140 is related to a dielectric constant of the human body, a facing area of the human body, and a distance of the human body. In the case where an inductive capacitance of the sensing branch 110 gradually increases, the SAR sensor 140 determines that a user is approaching the sensing branch 110, and in the case where the inductive capacitance of the sensing branch 110 gradually decreases, the SAR sensor 140 determines that the user is moving away from the sensing branch 110.

The controller may include a microprocessor. The microprocessor is connected to the SAR sensor 140. The microprocessor receives a detection signal and a noise signal, and compensates the detection signal according to the noise signal, thereby separating the noise signal from the detection signal. In practical applications, a processor of the electronic device may serve as the controller, which is not limited in embodiments of the disclosure.

In embodiments of the disclosure, the detection branch 120 detects a mixed signal of the wanted signal (i.e., the capacitance signal sensed by the sensing branch 110) and the first noise signal, and transmits the mixed signal to the SAR sensor 140. The compensation branch 130 detects the second noise signal. Subsequently, the wanted signal is obtained by cancelling, with an algorithm, common mode noise that is obtained by coupling the detection branch 120 and the compensation branch 130, thereby improving recognition sensitivity.

In the SAR detection assembly 10 provided in embodiments of the disclosure, the detection branch 120 transmits to the SAR sensor 140 the capacitive signal sensed by the sensing branch 110, and the compensation branch 130 generates the second noise signal by sensing ambient noise and transmits the second noise signal to the SAR sensor 140. The second noise signal is used to simulate the first noise signal that is generated by the detection branch 120 in response to ambient noise, so that the signal transmitted to the SAR sensor 140 by the detection branch 120 can be compensated through the second noise signal to separate the first noise signal, thereby improving detection accuracy of the SAR detection assembly 10. Therefore, the sensing branch 110 is allowable to be disposed at a position relatively far away from the SAR sensor 140, and the SAR sensor 140 can be connected to sensing branches at multiple positions. Furthermore, since the compensation branch 130 is not connected to the sensing branch 110, introduction of an additional blocking capacitor and so on to the circuit can be avoided, and thus an offset capacitance of the detection branch 120 can be effectively reduced to avoid an excessively large offset capacitance, thereby avoiding failure of the SAR sensor 140.

Figure 5:
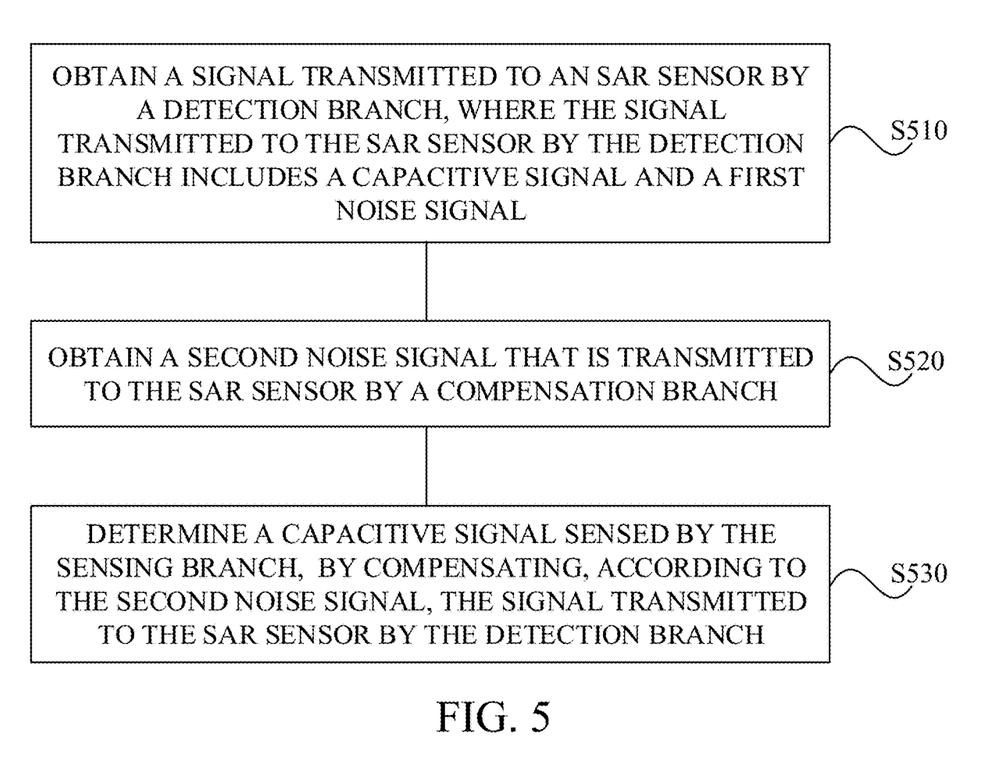
FIG. 5 is a flow chart illustrating a first type of an SAR detection method provided in exemplary embodiments of the disclosure.

An SAR detection method is further provided in exemplary embodiments of the disclosure. The method is applicable to the SAR detection assembly 10. As illustrated in FIG. 5, the SAR detection method includes the following.

At S510, obtain a signal transmitted to the SAR sensor by the detection branch, where the signal transmitted to the SAR sensor by the detection branch includes a capacitive signal and a first noise signal.

At S520, obtain a second noise signal that is transmitted to the SAR sensor by the compensation branch.

At S530, determine a capacitive signal sensed by the sensing branch, by compensating, according to the second noise signal, the signal transmitted to the SAR sensor by the detection branch.

The SAR detection assembly 10 includes a sensing branch 110, a detection branch 120, a compensation branch 130, and an SAR sensor 140. The sensing branch 110 is configured to sense a capacitive signal. A first end of the detection branch 120 is connected to the sensing branch 110. The SAR sensor 140 is connected to a second end of the detection branch 120. The capacitance signal sensed by the sensing branch 110 is transmitted to the SAR sensor 140 by the detection branch 120. The compensation branch 130 is connected to the SAR sensor 140. The compensation branch 130 is configured to generate a second noise signal by sensing ambient noise and transmit the second noise signal to the SAR sensor 140. The second noise signal is used to simulate the first noise signal to compensate, through the second noise signal, a signal transmitted to the SAR sensor 140 by the detection branch 120.

In the SAR detection method provided in embodiments of the disclosure, the detection branch 120 transmits to the SAR sensor 140 the capacitive signal sensed by the sensing branch 110, and the compensation branch 130 generates the second noise signal by sensing ambient noise and transmits the second noise signal to the SAR sensor 140. The second noise signal is used to simulate the first noise signal that is generated by the detection branch 120 in response to ambient noise, so that the signal transmitted to the SAR sensor 140 by the detection branch 120 can be compensated through the second noise signal to separate the first noise signal, thereby improving detection accuracy of the SAR detection assembly 10. Therefore, the sensing branch 110 is allowable to be disposed at a position relatively far away from the SAR sensor 140, and the SAR sensor 140 can be connected to sensing branches at multiple positions. That is, the multiple sensing branches 110 disposed at different positions of the electronic device can share one SAR sensor 140.

The following will describe in detail the operations of the SAR detection method provided in embodiments of the disclosure.

In the operation at S510, the signal transmitted to the SAR sensor by the detection branch can be obtained, where the signal transmitted to the SAR sensor by the detection branch includes the capacitive signal and the first noise signal.

An input end of the detection branch 120 is connected to the sensing branch 110, and an output end of the detection branch 120 is connected to the SAR sensor 140. An inductive capacitance of the sensing branch 110 changes in response to a human body approaching the sensing branch 110, and the detection branch 120 transmits a capacitance change signal to the SAR sensor 140.

The detection branch 120 extends from the sensing branch 110 to the SAR sensor 140. Other modules, such as a processor, a microprocessor, a memory, various types of sensors, and an imaging module, are generally disposed between the sensing branch 110 and the SAR sensor 140. These modules may interfere with a signal on the detection branch 120, and an interference signal may be generated on the detection branch 120 due to an environmental factor, such as an ambient temperature. That is, the mixed signal transmitted to the SAR sensor 140 by the detection branch 120 includes a wanted signal (i.e., the capacitance signal) and the first noise signal.

In the operation at S520, the second noise signal transmitted to the SAR sensor 140 by the compensation branch 130 may be obtained.

An input end of the compensation branch 130 is grounded, an output end of the compensation branch 130 is connected to the SAR sensor 140, and the compensation branch 130 senses the second noise signal in the transmission process. The compensation branch 130 is configured to detect a noise signal on an output path from the sensing branch 110 to the SAR sensor 140. A main source of noise on a transmission path includes interference of other modules of the electronic device on a wiring path and ambient thermal noise on the transmission path.

A layout path of the compensation branch 130 may be consistent with a layout path of the detection branch 120 to accurately simulate a noise signal on the detection branch 120. The layout path of the compensation branch 130 is consistent with the layout path of the detection branch 120, so that an interference signal and a thermal noise signal on the detection branch 120 are respectively consistent with an interference signal and a thermal noise signal on the compensation branch 130. That is, the noise signal on the detection branch 120 is consistent with a noise signal in a signal sensed by the compensation branch 130. The first noise signal detected by the detection branch 120 can be separated according to the second noise signal detected by the compensation branch 130, so that a wanted signal in the signal detected by the detection branch 120 can be obtained.

The detection branch 120 may generate a thermal noise signal in response to an ambient temperature, and the compensation branch 130 may generate a thermal noise signal in response to an ambient temperature. In order to ensure that the thermal noise signal generated by the detection branch 120 in response to the ambient temperature is consistent with the thermal noise signal generated by the compensation branch 130 in response to the ambient temperature, a capacitance-temperature curve of the detection branch 120 is required to be consistent with that of the compensation branch 130. The capacitance-temperature curve refers to a curve generated according to a change in a capacitance of a component in response to a change in temperature. That is, an equivalent capacitance of the detection branch 120 at any temperature is consistent with an equivalent capacitance of the compensation branch 130 at that temperature. Furthermore, a circuit parameter, such as an equivalent resistance and an equivalent inductance, of the detection branch 120 also is consistent with that of the compensation branch 130.

In the operation at S530, the capacitive signal sensed by the sensing branch can be determined by compensating, according to the second noise signal, the signal transmitted to the SAR sensor by the detection branch.

The signal detected by the detection branch 120 includes the wanted signal and the first noise signal, and the signal detected by the compensation branch 130 is the second noise signal. Therefore, the wanted signal can be obtained by separating, according to the second noise signal detected by the compensation branch 130, the first noise signal from the signal detected by the detection branch 120, and thus detection accuracy of the SAR detection assembly 10 can be improved through separation of the noise signal.

Since arrangement of the compensation branch 130 is consistent with that of the detection branch 120, the second noise signal generated by the compensation branch 130 in response to the external environment and the internal environment is the same as or similar to the first noise signal generated by the detection branch 120 in response to the external environment and the internal environment. The first noise signal can be completely or partially removed by removing the second noise signal from the mixed signal, and thus the detection accuracy of the SAR detection assembly 10 can be improved to some extent.

In embodiments of the disclosure, compensating, through the second noise signal, the signal transmitted to the SAR sensor 140 by the detection branch 120 means correcting, through the second noise signal, the signal transmitted to the SAR sensor 140 by the detection branch 120. The "compensating" may be addition or subtraction, and specific compensating may be performed according to a relative positive-negative relation between the capacitance signal and the noise signal, which is not specifically limited in embodiments of the disclosure.

In the SAR detection method provided in embodiments of the disclosure, the detection branch 120 transmits to the SAR sensor 140 the capacitive signal sensed by the sensing branch 110 and the first noise signal, and the compensation branch 130 generates the second noise signal by sensing ambient noise and transmits the second noise signal to the SAR sensor 140, where the second noise signal is used to simulate the noise signal on the signal transmission path to compensate, through the second noise signal, the signal transmitted to the SAR sensor 140 by the detection branch 120, and thus the detection accuracy of the SAR detection assembly 10 can be improved. Therefore, the sensing branch 110 is allowable to be disposed at a position relatively far away from the SAR sensor 140, and the SAR sensor 140 can be connected to sensing branches 110 at multiple positions.

An electronic device is further provided in embodiments of the disclosure. The electronic device includes the SAR detection assembly 10.

The SAR detection assembly 10 includes a sensing branch 110, a detection branch 120, a compensation branch 130, and an SAR sensor 140. The sensing branch 110 is configured to sense a capacitive signal. A first end of the detection branch 120 is connected to the sensing branch 110. The SAR sensor 140 is connected to a second end of the detection branch 120. The capacitance signal sensed by the sensing branch 110 is transmitted to the SAR sensor 140 by the detection branch 120. The compensation branch 130 is connected to the SAR sensor 140. The compensation branch 130 is configured to generate a second noise signal by sensing ambient noise and transmit the second noise signal to the SAR sensor 140. The second noise signal is used to simulate the first noise signal to compensate, through the second noise signal, a signal transmitted to the SAR sensor 140 by the detection branch 120.

In the electronic device provided in embodiments of the disclosure, the detection branch 120 transmits to the SAR sensor 140 the capacitive signal sensed by the sensing branch 110 and the first noise signal, and the compensation branch 130 generates the second noise signal by sensing ambient noise and transmits the second noise signal to the SAR sensor 140, where the second noise signal is used to simulate the noise signal on the signal transmission path to compensate, through the second noise signal, the signal transmitted to the SAR sensor 140 by the detection branch 120, and thus the detection accuracy of the SAR detection assembly 10 can be improved. Therefore, the sensing branch 110 is allowable to be disposed at a position relatively far away from the SAR sensor 140, and the SAR sensor 140 can be connected to sensing branches 110 at multiple positions.

The electronic device provided in embodiments of the disclosure may be, but is not limited to, a mobile phone, a tablet computer, a desktop computer, a smart phone, an e-book reader, a multimedia player, a camera, a wearable device, etc. The wearable device may include an accessory, such as a watch, a wristband, glasses, a necklace, a head-mounted electronic device, etc., and may further include a type of garment, such as a smart electronic garment, an implantable biological apparatus, etc., which are not specifically limited in embodiments of the disclosure.

The electronic device provided in embodiments of the disclosure is illustrated in detail by taking the electronic device as a mobile phone as an example.

Figure 6:
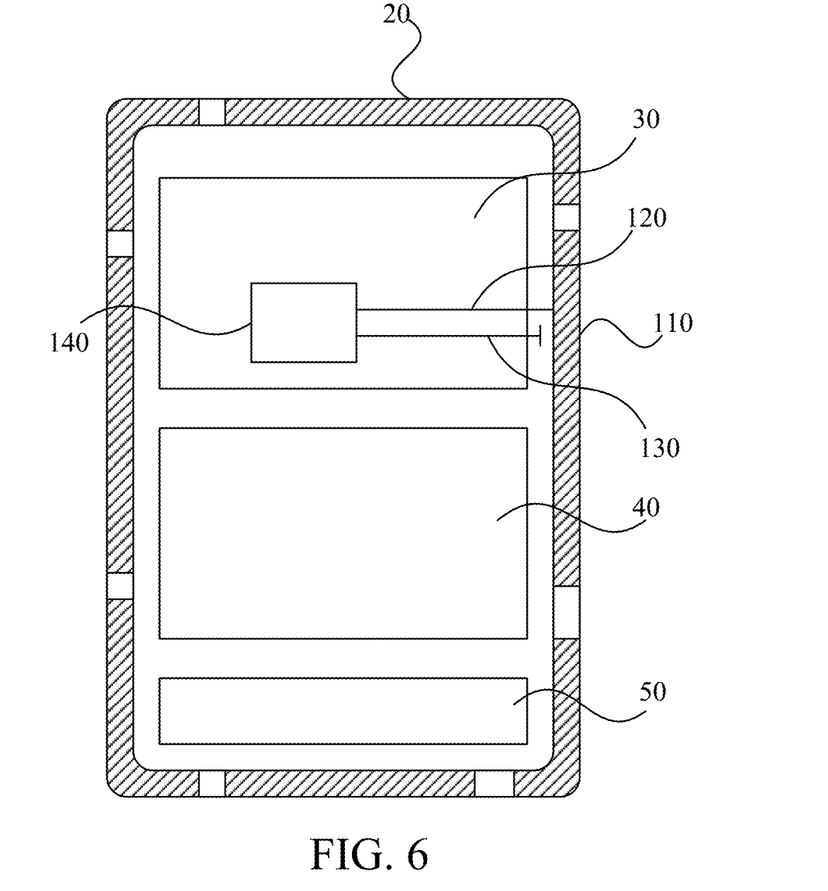
FIG. 6 is a schematic view of a first type of an electronic device provided in exemplary embodiments of the disclosure.

As illustrated in FIG. 6, the electronic device provided in embodiments of the disclosure may further include a display panel (not illustrated), a frame 20, a first circuit board 30 (mainboard), a battery 40, a rear cover (not illustrated), a second circuit board 50 (small board), and other components. The display panel, the frame 20, and the rear cover cooperate to define a receiving space for receiving other electronic elements or functional modules of the electronic device. Meanwhile, the display panel forms a display surface of the electronic device for displaying information such as an image and a text. The display panel may be a liquid crystal display (LCD), an organic light-emitting diode (OLED) display, or other types of display screens.

A glass cover plate may be disposed at the display panel. The glass cover plate may cover the display panel to protect the display panel, thereby preventing the display panel from being scratched or damaged by water.

The frame 20 may be hollow. The frame 20 may be made of a conductor such as metal. The frame 20 is divided into multiple sensing branches, and one or more of the multiple sensing branches may serve as the sensing branch 110.

The first circuit board 30 is mounted in the receiving space. For example, the first circuit board 30 may be mounted at the frame 20 and received in the receiving space together with the frame 20. The first circuit board 30 may include a grounding point and thus may be grounded through the grounding point. The SAR sensor 140 is disposed at the first circuit board 30.

One or more of functional modules, such as a motor, a microphone, a receiver, an earphone interface, a universal serial bus (USB) interface, a proximity sensor, an ambient-light sensor, a gyroscope sensor, a storage unit, and a processing unit, may also be integrated into the first circuit board 30. Meanwhile, the display panel may be electrically connected to the first circuit board 30. An image sensor may also be disposed at the mainboard.

The first circuit board 30 is further provided with a display control circuit. The display control circuit is configured to control the display panel to display information by outputting an electrical signal to the display panel. A light-emitting control unit and a color-changing control unit may be disposed at the mainboard.

Any one or more of a flexible circuit board, a volume button, a power button, a fingerprint module, a receiver, a speaker module, a camera module, a wireless charging module, a mainboard holder, a small-board holder, an NFC module, a camera decorative ring, and a conductor card holder may serve as the sensing branch 110. The fingerprint module, the receiver, the speaker module, the camera module, the wireless charging module, the NFC module, an electroacoustic module, and the camera decorative ring may be received in the receiving space. For example, the fingerprint module and the camera module may be disposed at the back of the display panel. The receiver and the speaker module may be disposed at the second circuit board 50, and the wireless charging module may be disposed at the first circuit board 30.

The battery 40 is mounted in the receiving space. For example, the battery 40 may be mounted at the frame 20 and received in the receiving space together with the frame 20. The battery 40 may be electrically connected to the first circuit board 30, so that the battery 40 can supply power to the electronic device. The first circuit board 30 may be provided with a power management circuit. The power management circuit is configured to distribute a voltage provided by the battery 40 to various electronic elements of the electronic device.

The rear cover forms an external contour of the electronic device. The rear cover may be integrally formed. In a forming process of the rear cover, a rear camera hole, a fingerprint-recognition-module mounting hole, and so on may be defined on the rear cover.

In the electronic device provided in embodiments of the disclosure, the battery 40 may be disposed between the first circuit board 30 and the second circuit board 50. The second circuit board 50 is disposed at one side of the battery 40 close to the bottom of the electronic device, and the first circuit board 30 is disposed at one side of the battery close to the top of the electronic device.

In the case where the SAR sensor 140 is disposed at the first circuit board 30, and the sensing branch 110 is an ANT radiator disposed at the bottom of the frame or is a fingerprint module, a small-board holder, a flexible-circuit-board branch, or another component disposed at the second circuit board 50, the detection branch 120 and the compensation branch 130 both extend from the first circuit board 30 to the second circuit board 50.

Figure 7:
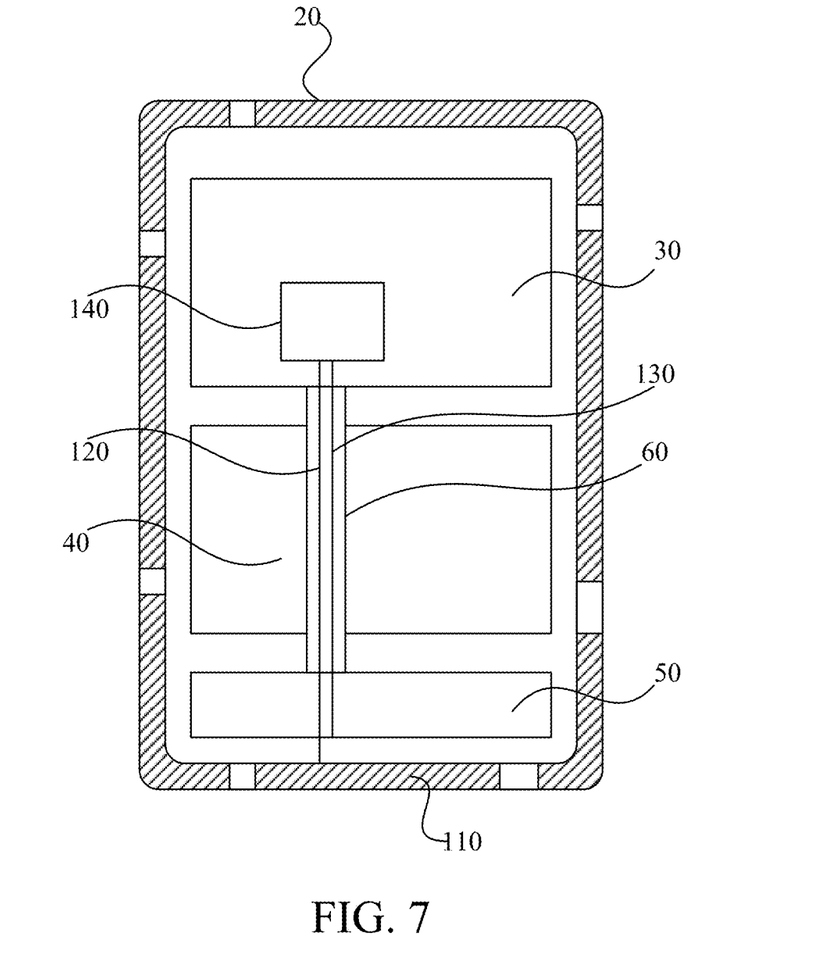
FIG. 7 is a schematic view of a second type of an electronic device provided in exemplary embodiments of the disclosure.

As illustrated in FIG. 7, in order to enable both the detection branch 120 and the compensation branch 130 to extend from the first circuit board 30 to the second circuit board 50, the SAR detection assembly 10 provided in embodiments of the disclosure may further include a base 60. The base 60 extends from the second circuit board 50 to the first circuit board 30, and the detection branch 120 and the compensation branch 130 are disposed at the base 60.

The base 60 may be a flexible circuit board or a liquid crystal polymer (LCP) film. Part of the detection branch 120 disposed at the base 60 may be a connection wire, a coaxial wire, etc. Part of the compensation branch 130 disposed at the base 60 may be a connection wire, a coaxial wire, etc.

In the case where the sensing branch 110 may include the ANT radiator, the ANT radiator 111 is disposed at the bottom of the frame of the electronic device, and the SAR sensor 140 is disposed at the first circuit board 30. The detection branch 120 and the compensation branch 130 both extend from the first circuit board 30 to the second circuit board 50 along the base 60. The detection branch 120 and the compensation branch 130 are arranged from the second circuit board 50, the base 60, to the first circuit board 30. The ANT radiator is adjacent to the second circuit board 50, and the detection branch 120 is connected to the ANT radiator. A compensation capacitor in the compensation branch 130 may be disposed at the second circuit board 50. The first inductive circuit 121 and the second inductive circuit 132 may be disposed at the second circuit board 50. The first inductive circuit 121 can prevent a high-frequency signal from being transmitted to the SAR sensor 140. The first inductive circuit 121 is disposed at the second circuit board 50, thereby preventing introduction of interference from the source.

In the case where the sensing branch 110 may include the inductor 111 disposed at the second circuit board 50, the SAR sensor 140 is disposed at the first circuit board 30. The detection branch 120 and the compensation branch 130 both extend from the second circuit board 50 to the first circuit board 30 along the base 60. The detection branch 120 and the compensation branch 130 are arranged from the second circuit board 50, the base 60, to the first circuit board 30. The detection branch 120 is connected to the sensing branch 110. The compensation capacitor in the compensation branch 130 may be disposed at the second circuit board 50 and is adjacent to the sensing branch 110. The first inductive circuit 121 and the second inductive circuit 132 may be disposed at the second circuit board 50. The first inductive circuit 121 can prevent a high-frequency signal from being transmitted to the SAR sensor 140. The first inductive circuit 121 is disposed at the second circuit board 50, thereby preventing introduction of interference from the source.

Figure 8:
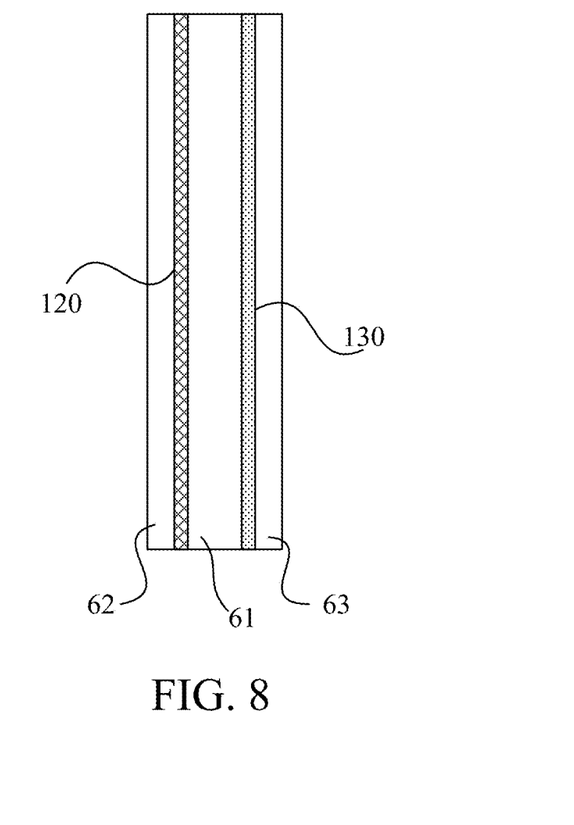
FIG. 8 is a schematic view of a base provided in exemplary embodiments of the disclosure.

As illustrated in FIG. 8, the base 60 may include a connection portion 61, a first epitaxial portion 62, and a second epitaxial portion 63. The first epitaxial portion 62 is connected to the connection portion 61. The second epitaxial portion 63 is connected to the connection portion 61 and disposed at one side of the connection portion 61 away from the first epitaxial portion 62. The detection branch 120 is disposed at one side of the connection portion 61 close to the first epitaxial portion 62, and the compensation branch 130 is disposed at one side of the connection portion 61 close to the second epitaxial portion 63.

The first epitaxial portion 62 can protect the detection branch 120, and the second epitaxial portion 63 can protect the compensation branch 130. Furthermore, with the first epitaxial portion 62, a parasitic capacitance of the detection branch 120 is not too large, and with the second epitaxial portion 63, a parasitic capacitance of the compensation branch 130 is not too large. A width of the first epitaxial portion 62 is greater than a preset width threshold, and a width of the second epitaxial portion 63 is greater than the preset width threshold. For example, the width of the first epitaxial portion 62 may be greater than or equal to 1 millimeter, and the width of the second epitaxial portion 63 may be greater than or equal to 1 millimeter.

The width of the first epitaxial portion 62 may be the same as the width of the second epitaxial portion 63. The width of the first epitaxial portion 62 is a distance between an edge of the first epitaxial portion 62 and the detection branch 120, and the width of the second epitaxial portion 63 is a distance between an edge of the second epitaxial portion and the compensation branch 130. The width of the first epitaxial portion 62 is the same as that of the second epitaxial portion 63, thereby ensuring that the compensation branch 130 and the detection branch 120 are in the same environment, and thus ensuring that a noise signal in a signal detected by the detection branch 120 is consistent with a noise signal detected by the compensation branch 130. That is, in a cross-board connection manner of differential dual channels provided in embodiments of the disclosure, the parasitic capacitance is small, and the impact of the ambient noise is small, thereby ensuring relatively high recognition sensitivity of the detection branch 120.

Figure 9:
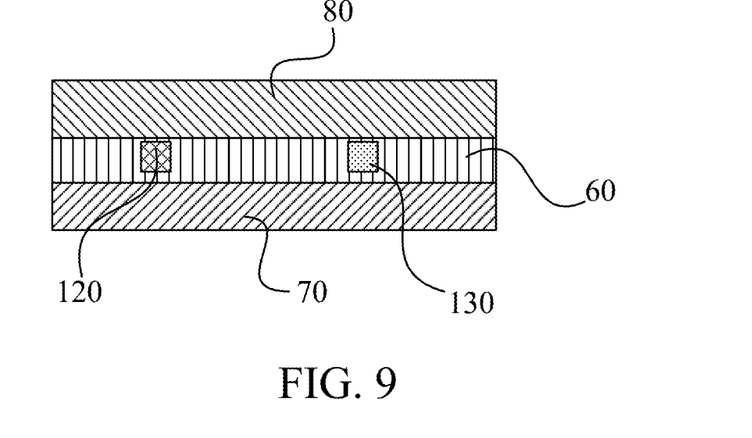
FIG. 9 is a schematic view of another base provided in exemplary embodiments of the disclosure.

As illustrated in FIG. 9, in order to prevent an interference signal in an environment or other components of the electronic device from interfering with the detection branch 120 and the compensation branch 130, the electronic device may further include a first shielding layer 70 and a second shielding layer 80. The first shielding layer 70 covers a surface of the base 60, and the second shielding layer 80 covers another surface of the base 60. The first shielding layer 70 and the second shielding layer 80 each may be a metal layer, for example, may be a silver film. In practical applications, the first shielding layer 70 and the second shielding layer 80 each may be made of copper, aluminum, magnesium, etc. The first shielding layer 70 and the second shielding layer 80 cover the base 60, so that an external signal can be shielded, thereby preventing an external interference signal from affecting a detection result, and thus improving SAR detection accuracy.

In practical applications, other components of the electronic device may serve as the first shielding layer 70 and the second shielding layer 80 due to the following. Disposing the first shielding layer 70 and the second shielding layer 80 respectively at the two sides of the base 60 may form a too thick composite base, which is not conducive to lightening and thinning of the electronic device, furthermore, the composite base has an increased hardness, which is not conducive to wiring (bending wiring and folding wiring) of the base 60.

Figure 10:
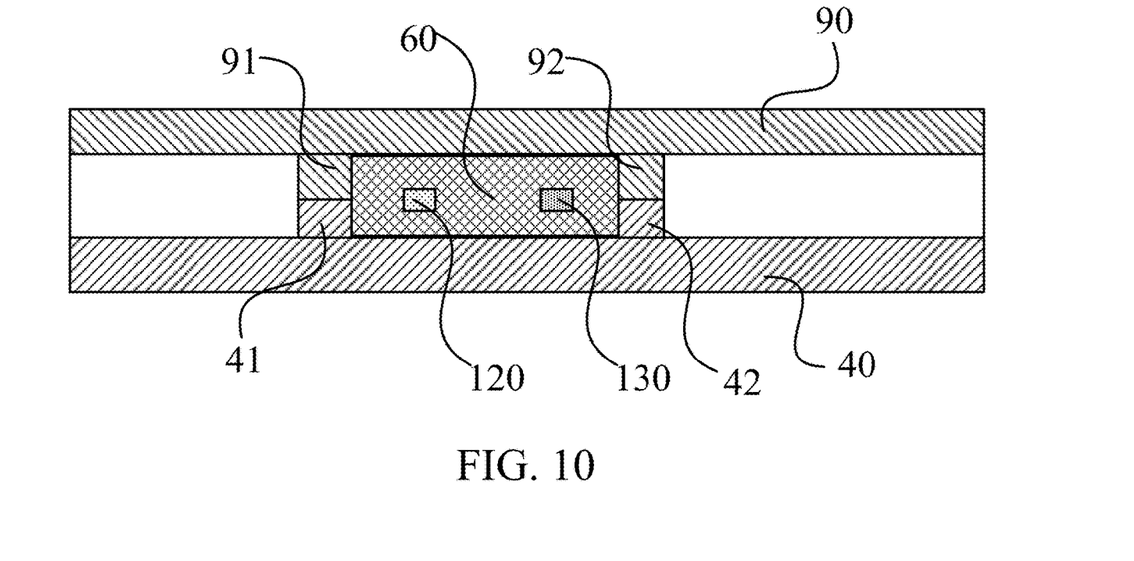
FIG. 10 is a schematic view of a third type of an electronic device provided in exemplary embodiments of the disclosure.

In the electronic device, the display panel forms a front casing 90, and a metal layer is disposed at a back surface of the display panel, that is, the metal layer is disposed at one side of the front casing 90 close to the mainboard. The metal layer may be configured to form the first shielding layer 70. A first shielding region may be defined on the metal layer at the back of the display panel, and the first shielding region faces the base 60. As illustrated in FIG. 10, there are a first protrusion 91 and a second protrusion 92 in the first shielding region, a first accommodation portion is defined between the first protrusion 91 and the second protrusion 92, and the base 60 may be embedded in the accommodation portion.

The base 60 is disposed between the battery 40 and the front casing 90, that is, the battery 40 is disposed at one side of the base 60 away from the front casing 90. An outside of the battery 40 may be coated with a metal layer, and the battery 40 forms the second shielding layer 80. A second shielding region is defined at one side of the battery 40 facing the base 60, and the second shielding region faces the base 60. There are a third protrusion 41 and a fourth protrusion 42 in the second shielding region, a second accommodation portion is defined between the third protrusion 41 and the fourth protrusion 42, and the base 60 may be embedded in the accommodation portion.

It needs to be noted that, the electronic device provided in embodiments of the disclosure may include multiple sensing branches 110. One sensing branch 110 disposed at the bottom of the frame is connected to the SAR sensor 140 at the mainboard via the detection branch 120 and the compensation branch 130. One sensing branch 110 disposed around the mainboard is connected to the SAR sensor 140 via the detection branch 120 and the compensation branch 130.

Figure 11:
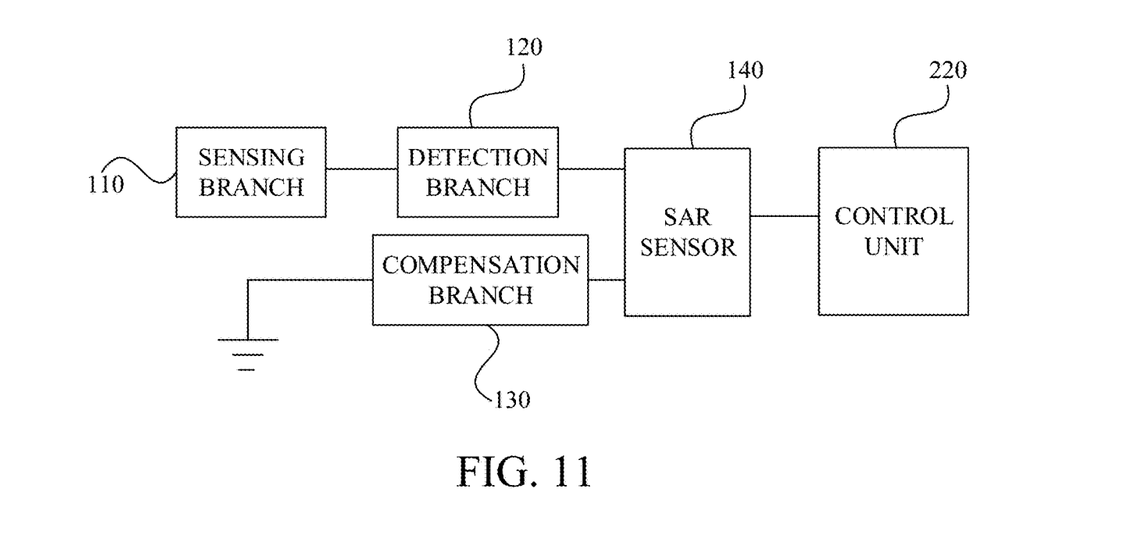
FIG. 11 is a schematic block diagram of an electronic device provided in exemplary embodiments of the disclosure.

Furthermore, as illustrated in FIG. 11, the electronic device provided in embodiments of the disclosure may further include a control unit 220. The control unit 220 is connected to the SAR sensor 140 and is configured to adjust a corresponding antenna back-off power according to a compensated detection signal. The control unit 220 may be connected to the RF module to adjust a transmit power of the RF module (antenna back-off power).

The control unit 220 determines, according to a compensated capacitance signal detected by the SAR sensor 140, a manner in which a user holds the electronic device, and determines, according to the manner in which the user holds the electronic device, the back-off power of the electronic device. For example, when the user holds the electronic device at a position corresponding to the sensing branch 110 with one hand, a back-off power of a corresponding ANT radiator is increased, and an SAR value of the corresponding ANT radiator is decreased.

In the electronic device provided in embodiments of the disclosure, the detection branch 120 transmits to the SAR sensor 140 the capacitive signal sensed by the sensing branch 110, and the compensation branch 130 generates the second noise signal by sensing ambient noise and transmits the second noise signal to the SAR sensor 140. The second noise signal is used to simulate the first noise signal that is generated by the detection branch 120 in response to ambient noise, so that the signal transmitted to the SAR sensor 140 by the detection branch 120 can be compensated through the second noise signal to separate the first noise signal, thereby improving detection accuracy of the SAR detection assembly. Furthermore, since the compensation branch 130 is not connected to the sensing branch 110, introduction of an additional blocking capacitor and so on to the circuit can be avoided, and thus an offset capacitance of the detection branch 120 can be effectively reduced to avoid an excessively large bottom capacitance, thereby avoiding failure of the SAR sensor 140. Therefore, the sensing branch 110 is allowable to be disposed at a position relatively far away from the SAR sensor 110, and the SAR sensor 140 can be connected to sensing branches at multiple positions.

After considering the specification and implementing the invention disclosed herein, other embodiments of the disclosure may be readily derived by those skilled in the art. The disclosure is intended to cover any variations, applications or adaptive change of the disclosure, and these variations, applications or adaptive change follow the general principles of the disclosure and include common sense or conventional technical means in the art not disclosed in the disclosure. The specification and embodiments are merely considered to be exemplary, and the true scope and spirit of the disclosure are defined by the appended claims.

What is claimed is:

1. A specific absorption rate (SAR) detection assembly, comprising:
   a sensing branch configured to sense a capacitive signal;
   a detection branch, a first end of the detection branch being connected to the sensing branch, the detection branch being configured to transmit the capacitive signal and generate a first noise signal by sensing ambient noise;
   an SAR sensor connected to a second end of the detection branch, the capacitive signal and the first noise signal being transmitted to the SAR sensor by the detection branch; and
   a compensation branch, a first end of the compensation branch being connected to a reference power-supply terminal, a second end of the compensation branch being connected to the SAR sensor, the compensation branch being configured to generate a second noise signal by sensing ambient noise and transmit the second noise signal to the SAR sensor, and the second noise signal being used to simulate the first noise signal to compensate, through the second noise signal, the capacitive signal and the first noise signal that are transmitted to the SAR sensor by the detection branch; wherein a layout path of the compensation branch is consistent with a layout path of the detection branch.

2. The SAR detection assembly of claim 1, wherein the compensation branch is configured to enable the second noise signal to be consistent with the first noise signal.

3. The SAR detection assembly of claim 2, wherein a capacitance-temperature curve of the detection branch is consistent with a capacitance-temperature curve of the compensation branch.

4. The SAR detection assembly of claim 1, wherein the detection branch comprises:
   a first inductive circuit, wherein a first end of the first inductive circuit is connected to the sensing branch; and
   a first filter circuit, wherein a first end of the first filter circuit is connected to a second end of the first inductive circuit, and a second end of the first filter circuit is connected to the SAR sensor.

5. The SAR detection assembly of claim 4, wherein the compensation branch comprises:
   a compensation capacitor circuit, wherein a first end of the compensation capacitor circuit is grounded, and the reference power-supply terminal is a grounding terminal;
   a second inductive circuit, wherein a first end of the second inductive circuit is connected to a second end of the compensation capacitor circuit; and
   a second filter circuit, wherein a first end of the second filter circuit is connected to a second end of the second inductive circuit, and a second end of the second filter circuit is connected to the SAR sensor.

6. The SAR detection assembly of claim 5, wherein both the second inductive circuit and the compensation capacitor circuit are configured to enable a circuit parameter of the compensation branch to be consistent with a circuit parameter of the detection branch, wherein the circuit parameter comprises one or more of an equivalent resistance, an equivalent inductance, and an equivalent capacitance.

7. The SAR detection assembly of claim 1, wherein the sensing branch is an antenna (ANT) radiator, wherein the ANT radiator is disposed at a frame of an electronic device and is connected to the detection branch.

8. The SAR detection assembly of claim 1, wherein the sensing branch is an inductor, wherein the inductor is connected to the detection branch and is configured to generate a capacitive signal by sensing a distance between a user and the inductor.

9. The SAR detection assembly of claim 8, wherein the inductor is a parasitic branch, wherein the parasitic branch is coupled to a corresponding ANT radiator and is configured to sense the capacitive signal.

10. The SAR detection assembly of claim 8, wherein the inductor is one or more of a flexible circuit board, a volume button, a power button, a fingerprint module, a receiver, a speaker module, a camera module, a wireless charging module, a mainboard holder, a small-board holder, a near field communication (NFC) module, a camera decorative ring, an electroacoustic module, and a conductor card holder.

11. A specific absorption rate (SAR) detection method, applicable to an SAR detection assembly and comprising:
   obtaining a signal transmitted to an SAR sensor of the SAR detection assembly by a detection branch of the SAR detection assembly, the signal transmitted to the SAR sensor by the detection branch comprising a capacitive signal and a first noise signal, the SAR sensor being connected to a second end of the detection branch;

obtaining a second noise signal that is transmitted to the SAR sensor by a compensation branch of the SAR detection assembly, a first end of the compensation branch being connected to a reference power-supply terminal, a second end of the compensation branch being connected to the SAR sensor, and the compensation branch being configured to generate the second noise signal by sensing ambient noise, wherein a layout path of the compensation branch is consistent with a layout path of the detection branch; and determining a capacitive signal sensed by a sensing branch of the SAR detection assembly, by compensating, according to the second noise signal, the signal transmitted to the SAR sensor by the detection branch, a first end of the detection branch being connected to the sensing branch.

12. An electronic device comprising:
a specific absorption rate (SAR) detection assembly comprising:
a sensing branch configured to sense a capacitive signal;
a detection branch, a first end of the detection branch being connected to the sensing branch, the detection branch being configured to transmit the capacitive signal and generate a first noise signal by sensing ambient noise;
an SAR sensor connected to a second end of the detection branch, the capacitive signal and the first noise signal being transmitted to the SAR sensor by the detection branch; and
a compensation branch, a first end of the compensation branch being connected to a reference power-supply terminal, a second end of the compensation branch being connected to the SAR sensor, the compensation branch being configured to generate a second noise signal by sensing ambient noise and transmit the second noise signal to the SAR sensor, and the second noise signal being used to simulate the first noise signal to compensate, through the second noise signal, the capacitive signal and the first noise signal that are transmitted to the SAR sensor by the detection branch;
wherein a layout path of the compensation branch is consistent with a layout path of the detection branch.

13. The electronic device of claim 12, further comprising:
a first circuit board, wherein the SAR sensor is disposed at the first circuit board; and
a second circuit board, wherein the detection branch and the compensation branch both extend from the first circuit board to the second circuit board.

14. The electronic device of claim 13, further comprising:
a base extending from the first circuit board to the second circuit board and configured to carry the detection branch and the compensation branch.

15. The electronic device of claim 14, wherein the base comprises:
a connection portion;
a first epitaxial portion connected to the connection portion; and
a second epitaxial portion connected to the connection portion and disposed at one side of the connection portion away from the first epitaxial portion, wherein the detection branch is disposed at one side of the connection portion close to the first epitaxial portion, and the compensation branch is disposed at one side of the connection portion close to the second epitaxial portion.

16. The electronic device of claim 15, wherein a width of the first epitaxial portion is the same as a width of the second epitaxial portion, the width of the first epitaxial portion is a distance between an edge of the first epitaxial portion and the detection branch, and the width of the second epitaxial portion is a distance between an edge of the second epitaxial portion and the compensation branch.

17. The electronic device of claim 14, further comprising:
a first shielding layer covering a surface of the base; and
a second shielding layer covering another surface of the base.

18. The electronic device of claim 17, further comprising:
a front casing, wherein a metal layer is disposed at one side of the front casing close to a mainboard and is configured to form the first shielding layer; and
a battery disposed at one side of the base away from the front casing and configured to form the second shielding layer.

19. The electronic device of claim 18, wherein the front casing comprises:
a display screen, wherein another metal layer is disposed on a back surface of the display screen and is configured to form the first shielding layer.

* * * * *